March 16, 1954　　　M. H. JEWETT　　　2,672,247
VEHICLE BODY
Filed March 22, 1951　　　　　　　　　　　3 Sheets-Sheet 1
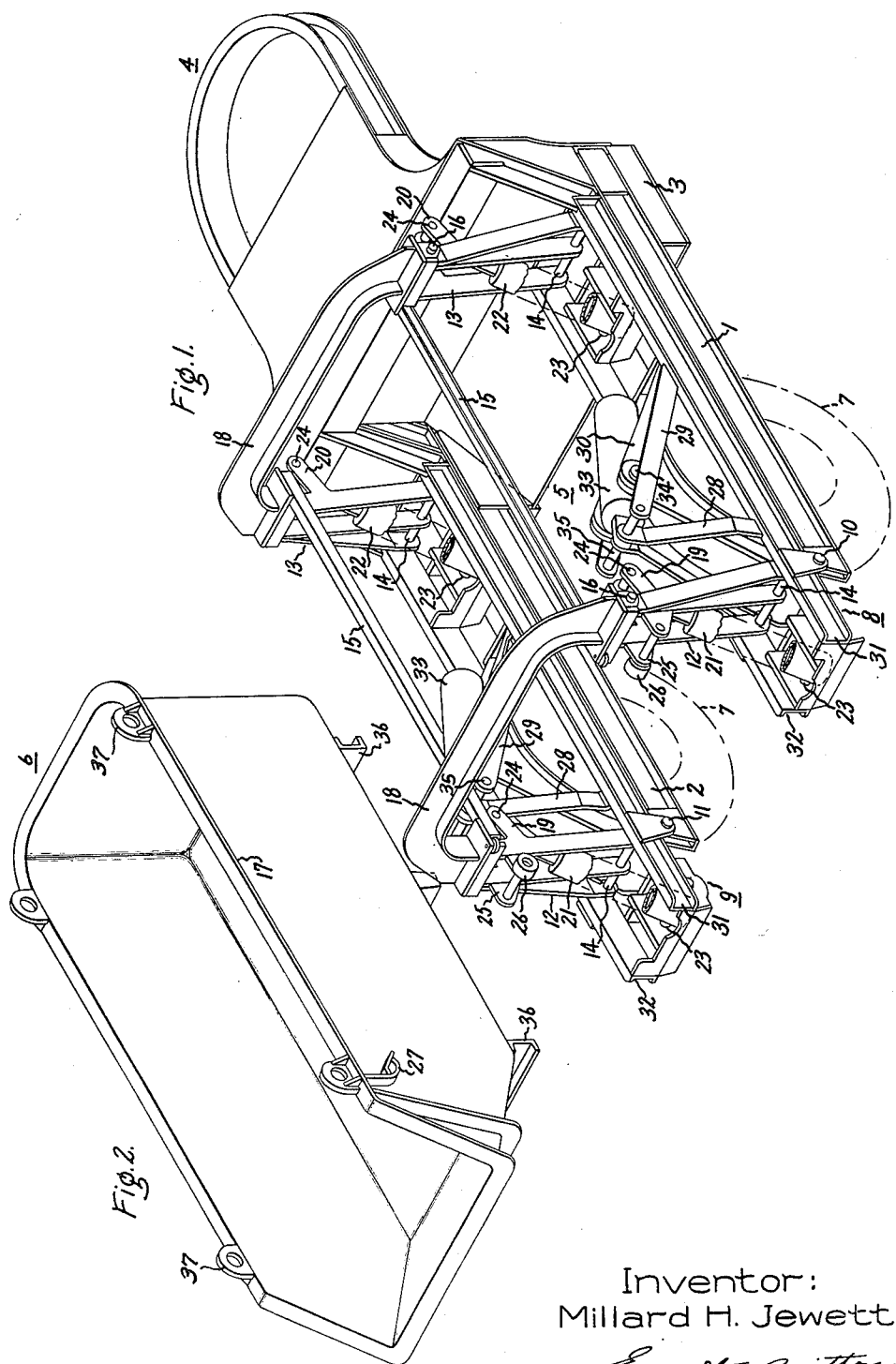
Inventor:
Millard H. Jewett,
by Ernest C. Britton
His Attorney.

March 16, 1954 M. H. JEWETT 2,672,247
VEHICLE BODY
Filed March 22, 1951 3 Sheets-Sheet 2
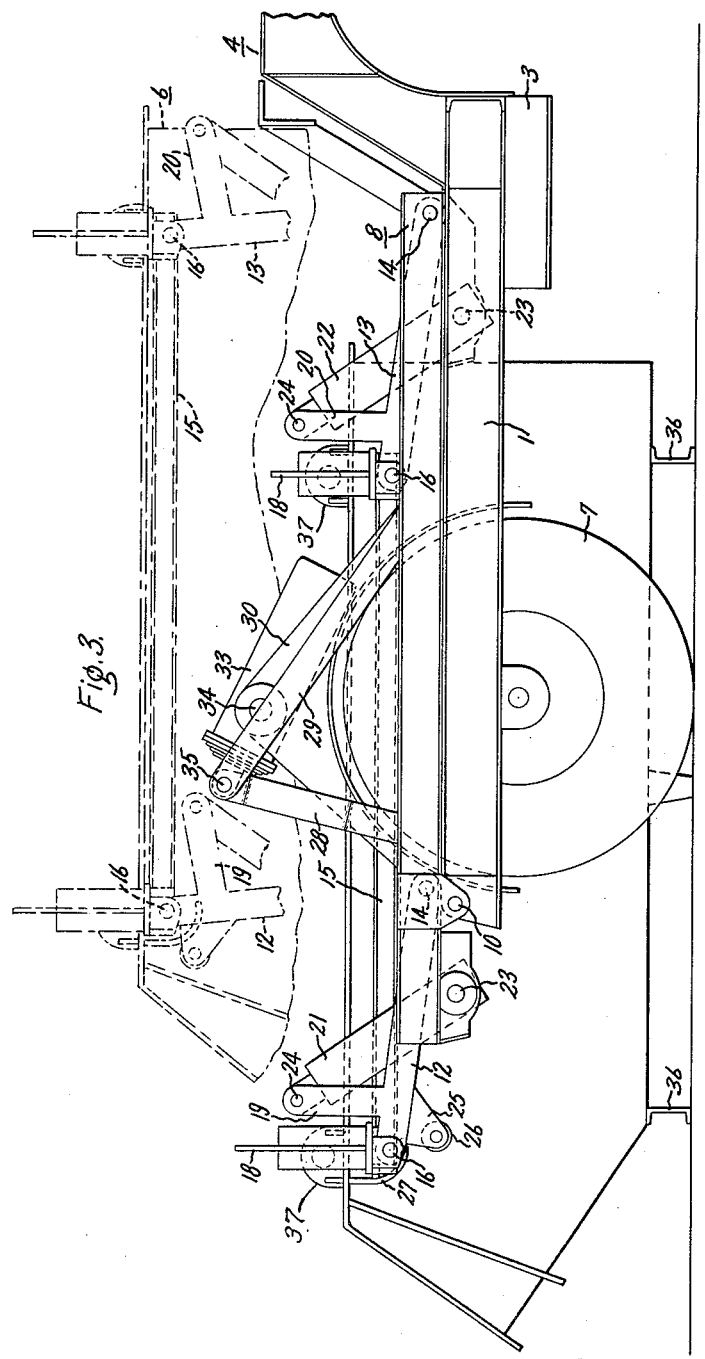
Inventor:
Millard H. Jewett,
by Ernest C. Britton
His Attorney.

March 16, 1954 M. H. JEWETT 2,672,247
VEHICLE BODY
Filed March 22, 1951 3 Sheets-Sheet 3
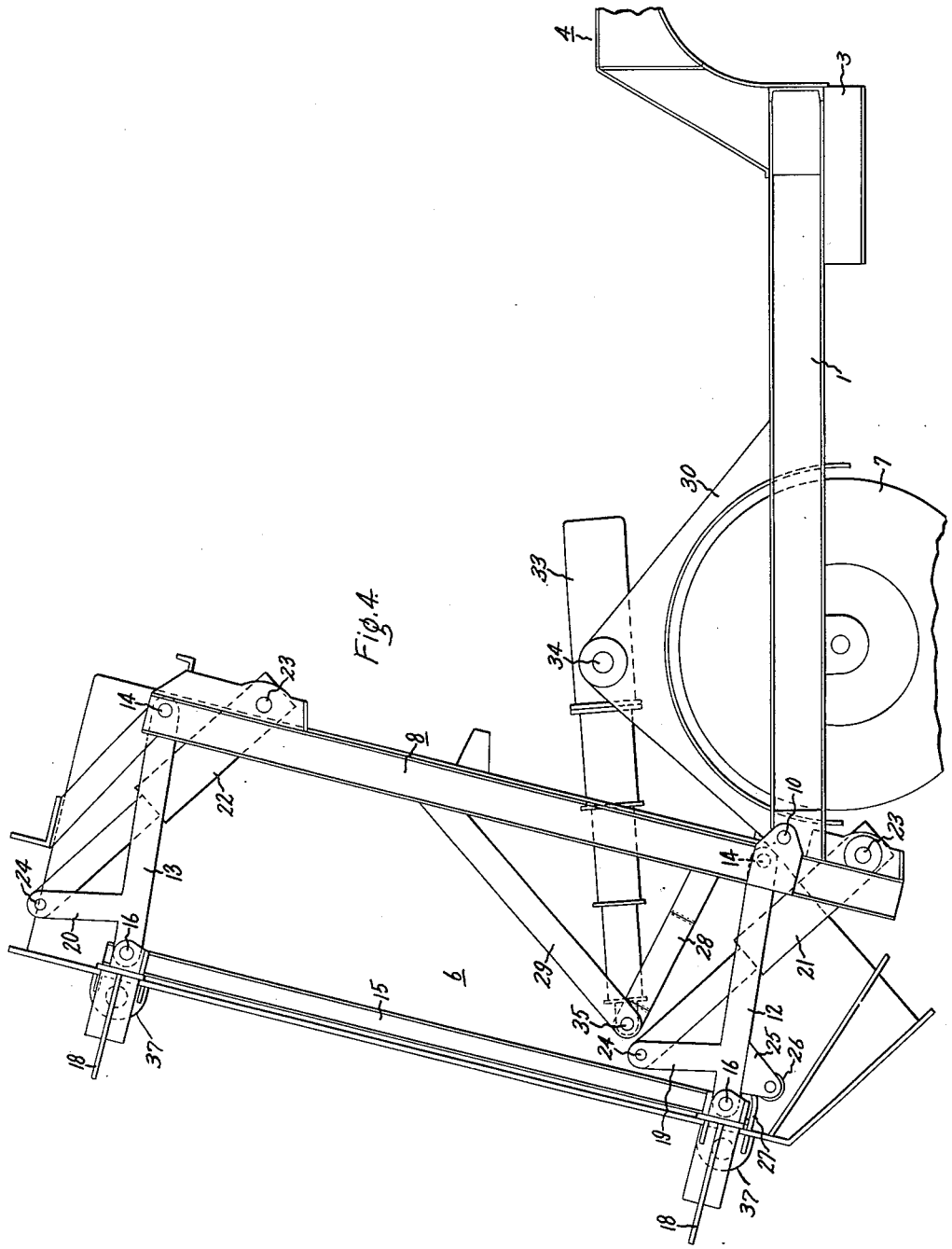
Inventor:
Millard H. Jewett,
by Ernest H. Britton
His Attorney.

Patented Mar. 16, 1954

2,672,247

UNITED STATES PATENT OFFICE 2,672,247

VEHICLE BODY

Millard H. Jewett, Schenectady, N. Y., assignor to General Electric Company, a corporation of New York Application March 22, 1951, Serial No. 216,971

14 Claims. (Cl. 214—314)

This invention relates to bodies for trucks, trailers, and the like, and more specifically to a body structure adapted to pick up a material container from the ground, transport the container, and to dump the same.

In the handling of certain types of materials, particularly scrap, large containers are provided which may be located at various places in a manufacturing installation to be filled with material, for example scrap. When filled, these containers must be picked up and transported to another location where it may be desirable to empty the containers by dumping. The empty container must then be returned to the using location and left at that place. It is therefore desirable to provide a vehicle, either in the form of a truck or a trailer which will pick up these large containers from the ground, carry the containers to another location, dump the container, and then return the container to its using location and deposit it there for subsequent use.

An object of this invention is to provide a vehicle body constructed so as to pick up, transport, and dump a material container.

Further objects and advantages of this invention will be readily apparent and the invention will be more clearly understood by reference to the following description and the accompanying drawing, and the features of the novelty which characterize this invention will be pointed out with particularity in the claims annexed to and forming a part of this specification.

In its broadest aspects, this invention provides a vehicle body having a stationary frame assembly with wheels attached thereto, arranged on either side of a compartment open at one end. A tiltable frame assembly is in turn pivotally mounted on the stationary frame assembly, straddling the open-ended compartment so that the container may be received therein. Container engaging means are pivotally mounted on the tiltable frame assembly and are adapted in a first position to engage the container when on the ground, and in a second position to carry the container in the compartment. Means are provided for actuating the container engaging means to move them from the first position into the second position, thereby lifting the container off the ground and moving it into the compartment, and means are further provided for tilting the tiltable frame assembly so that the container may be dumped.

In the drawing, Fig. 1 is a view in perspective illustrating the improved vehicle body construction of this invention; Fig. 2 illustrates the container handled by the construction in Fig. 1; Fig. 3 is a side elevational view illustrating the operation of the device in lifting the container off the ground into the carrying position; and Fig. 4 illustrates the dumping action of the vehicle.

Referring now to Fig. 1, there is shown the improved body construction of this invention as applied to a trailer, however, it will be readily understood that the same construction could be equally applied to a truck. In this construction a U-shaped stationary frame assembly is provided having longitudinally extending and transversely spaced apart side frame members 1 and 2 connected by a transverse frame member 3. The trailer hitching mechanism, shown generally at 4, is secured to the stationary frame assembly through the transverse member 3. The side frame members 1 and 2 and the transverse member 3 define a compartment 5 with its open end at the rear of the vehicle, which, as will be hereinafter described, is adapted to receive the container 6 shown in Fig. 2. Spaced apart wheels 7, shown in dashed lines, are connected to the side frame members 1 and 2 in any suitable member and respectively straddle the compartment 5.

A tiltable frame assembly is pivotally mounted on the stationary frame assembly and includes a pair of transversely spaced apart longitudinally extending frame members 8 and 9, which are respectively pivoted to the stationary side frame members 1 and 2, as at 10 and 11, the pivotal connection being remote from the transverse member 3 and adjacent the open end of the compartment 5. The tiltable frame members 8 and 9, as will be seen in Fig. 1, also straddle the compartment 5 and are arranged immediately over and in the plane of the stationary side frame members 1 and 2.

In order to provide for picking up and carrying the container 6, each of the tiltable side frame members 8 and 9 is provided with a pair of lever members 12 and 13. The lever members 12 and 13 are spaced apart, with the levers 13 being arranged adjacent the front end of the tiltable side frame members 8 and 9 and the levers 12 being arranged toward the rear end of the tiltable side frame members. Each of the lever members 12 and 13 has one end pivotally secured to the tiltable side frame members, as at 14, and the outer ends of each pair of levers 12 and 13 are respectively connected by a bar member 15, which is pivotally secured thereto, as at 16. As will be hereinafter described, the bar members 15 engage the underside of lip 17 of the container 6. The bars 15 and the levers 12 and 13 are respectively joined by brace members 18 straddling the chamber 5. These brace members 18, together with the bars 15, insure that all of the lever members 12 and 13 move in unison.

Each of the lever members 12 and 13 is provided with a projecting portion 19 and 20 respectively at its outer end, extending toward the front of the vehicle. In order to raise and lower the lever members 12 and 13, hydraulic cylinders 21 and 22 are provided, respectively pivotally mounted to the tiltable side frame members 8 and 9, as at 23, and operatively connected to the level projections 19 and 20 as at 24. The cylinders 21 and 22 are arranged rearwardly of the lever members 12 and 13 on the side remote from the projections 19 and 20. The rear lever members 12 are also provided with projections 25 at their outer ends on the side remote from the projections 19, to which engaging members 26 are attached. These engaging members engage flange portions 27 on the container 6 when the container is in the carrying position to permit dumping of the container, as will be hereinafter described.

In order to provide for dumping a container, fixed lever members 28 and 29 are mounted on the upper side of the tiltable side frame members 8 and 9, and a hydraulic cylinder mounting member 30 is mounted on the stationary side frame members 1 and 2 projecting upwardly intermediate the channel members 31 and 32, forming the tiltable side frame members 8 and 9. Hydraulic cylinders 33 are pivotally secured to the mounting members 28, as at 34, and are operatively connected to the fixed lever members 26 and 27, as at 35.

Referring now to Fig. 3, there is shown the operation of this improved body construction in picking up the container 6 from the ground and moving it into a carrying position. As will be readily seen from an inspection of Fig. 3, the levers 12 and 13 may be lowered to a first position, as shown in solid lines, in which the pistons of the cylinders 21 and 22 are at their innermost positions. With the levers 12 and 13, together with bars 15 lowered, as shown in solid lines, the vehicle may be backed over the container 6, which is shown standing on legs 36, so that the container is in the compartment 5 straddled by the stationary side frame members 1 and 2, and the tiltable side members 8 and 9. In this position, the bars 15 engage the under side of the lip 17 of the channel 6. Also in this position, the engaging members 26 attached to the projection 25, by virtue of the lowered position of the lever 12, do not engage the flanges 27 of the container 6. In order to raise the container into the carrying position, as shown in dashed lines in Fig. 3, hydraulic pressure is applied from any suitable source (not shown) to the cylinders 21, forcing their pistons outwardly, thus raising the levers 12 and 13 to the positions shown in dashed lines. It will be readily apparent that the bars 15 engaging the underside of the lip 17 of the container 6 serve to lift the container off the ground as the levers 12 and 13 are raised, and that the engaging members 26 will engage the flanges 27 when the arms 12 are in the raised position. The truck or trailer may now be moved to transport the container to the dumping location.

Referring now to Fig. 4, there is shown the manner of dumping the container 6. Here, after the levers 12 and 13 have been raised to their carrying position by the cylinders 21 and 22 so that bar 15 raises the container 6 so that it is carried in the chamber 5, the engaging members 26 on the projections 25 of levers 12 engage the flanges 27 of the container 6, as shown. Hydraulic pressure from a suitable source (not shown) is now applied to the cylinder 33, causing its piston to move outwardly to tilt the tiltable frame assembly and the tiltable side members 8 and 9 about pivot 10, is shown. The engagement of the engaging members 26 with the flanges 27 of the container 6 prevent the container from sliding or falling, and the dumping operation may therefore be completed. The lifting lugs 37 on container 6 cooperate with the brace members 18 during the dumping operation to prevent the container 6 from lifting up with respect to the frame members 8 and 9 and thus allowing the flanges 27 to ride over the roller portions of engaging members 26. After dumping, pressure is released from the cylinder 33, causing the tiltable frame assembly and the side members 8 and 9 to lower, thus lowering the container 6 to the position shown in dashed lines in Fig. 3, with the levers 12 and 13 raised so that the container 6 is carried off the ground in the compartment 5. The vehicle may now return to the desired location of the container and the container is placed on the ground by releasing the fluid pressure from the cylinders 21 and 22, so that the levers 12 and 13 lower to the position shown in solid lines in Fig. 3, with the legs 36 of the container 6 resting on the ground. The vehicle may now be moved away from the container, leaving the container resting alone on the ground.

It will now be readily apparent that this invention provides an improved vehicle body construction which will lift a container off the ground, and transport it, and which will in addition dump the container.

While I have shown and described a particular embodiment of this invention, further modifications and improvements will occur to those skilled in the art. I desire it to be understood, therefore, that this invention is not limited to the embodiment shown, and I intend in the appended claims to cover all modifications which do not depart from the spirit and scope of this invention.

What I claim as new and desire to secure by Letters Patent of the United States is:

1. A vehicle adapted to pick up and transport a container and to dump the same, comprising a stationary frame assembly having transversely spaced apart wheels connected thereto for supporting said vehicle and having a compartment between said wheels open at one end for receiving said container, a tiltable frame assembly pivotally mounted on said stationary frame assembly and straddling said compartment, means adapted in a first position to engage said container and in a second position to carry said container in said compartment, said last-mentioned means being pivotally mounted on said tiltable frame member, means for actuating said container-engaging means for moving the same from said first position to said second position thereof whereby said container is picked up from the ground and carried in said compartment, means for tilting said tiltable frame assembly whereby said container is dumped, and means for retaining said container in said tiltable frame assembly during the tilting operation.

2. A vehicle adapted to pick up and transport a container and to dump the same, comprising a stationary frame assembly having transversely spaced apart longitudinally extending side members defining a compartment open at one end for receiving said container, wheels respectively connected to said side members on either side of said compartment for supporting said vehicle, a tiltable frame assembly pivotally connected to said stationary frame assembly adjacent the open end of said compartment and straddling the same, means adapted in a first position to engage said container and in a second position to carry said container in said compartment, said last-mentioned means being pivotally mounted on said tiltable frame assembly, means on said tiltable frame assembly for actuating said container-engaging means for moving the same from said first position to said second position thereof whereby said container is picked up from the ground and carried in said compartment, means on said stationary frame assembly for tilting said tiltable frame assembly whereby said container is dumped, and means for retaining said container in said tiltable frame assembly during the tilting operation.

3. A vehicle adapted to pick up and transport a container and to dump the same, comprising a stationary frame assembly having transversely spaced apart longitudinally extending side members defining a compartment open at one end for receiving said container, wheels respectively connected to said side members on either side of said compartment for supporting said vehicle, a tiltable frame assembly having a pair of longitudinally extending side members on either side of said compartment respectively pivoted to said stationary frame side members adjacent said open end of said compartment, a pair of container-engaging members respectively pivotally mounted on said tiltable frame side members adapted in a lowered position to engage said container when on the ground and in a raised position to carry said container in said compartment, means on said tiltable frame member for actuating said container-engaging means for raising and lowering the same whereby said container is picked up from the ground and carried in said compartment, means respectively mounted on said stationary frame assembly side members and operatively connected to said tiltable frame assembly side members for tilting said tiltable frame assembly whereby said container is dumped, and means for retaining said container in said tiltable frame assembly during the tilting operation.

4. A vehicle adapted to pick up and transport a container and to dump the same, comprising a stationary substantially U-shaped frame assembly having a pair of transversely spaced apart longitudinally extending side members and a transverse member connecting said side members at one end thereof defining a compartment open at one end for receiving said container, wheels respectively connected to said side members on either side of said compartment for supporting said vehicle, a tiltable frame assembly having a pair of longitudinally extending side members on either side of said compartment respectively pivoted to said stationary frame side members adjacent the open end of said compartment at points remote from said transverse frame member, a pair of container-engaging members respectively pivotally mounted on said tiltable frame assembly side members adapted in a lowered position to engage said container while on the ground and in a raised position to carry said container in said compartment, means respectively mounted on said tiltable frame assembly side members and operatively connected to said container-engaging members for raising and lowering the same whereby said container is picked up from the ground and carried in said compartment, means respectively mounted on said stationary frame assembly side members and operatively connected to said tiltable frame assembly side members for tilting said tiltable frame assembly whereby said container is dumped, and means for retaining said container in said tiltable frame assembly during the tilting operation.

5. A vehicle adapted to pick up and transport a container and to dump the same, comprising a stationary substantially U-shaped frame assembly having a pair of transversely spaced apart longitudinally extending side members and a transverse member connecting said side members at one end thereof defining a compartment open at one end for receiving said container, wheels respectively connected to said side members on either side of said compartment for supporting said vehicle, a tiltable frame assembly having a pair of longitudinally extending side members on either side of said compartment respectively pivoted to said stationary frame side members adjacent the open end of said compartment at points remote from said transverse frame member, a pair of container-engaging members respectively pivotally mounted on each of said tiltable frame assembly side members adapted in a lowered position to engage said container when on the ground and in a raised position to carry said container in said compartment, means respectively mounted on said tiltable frame assembly side members and operatively connected to said container-engaging members for raising and lowering the same whereby said container is picked up from the ground and carried in said compartment, means respectively mounted on said stationary frame assembly side members and operatively connected to said tiltable frame assembly side members for tilting said tiltable frame assembly whereby said container is dumped, and means for retaining said container in said tiltable frame assembly during the tilting operation.

6. A vehicle adapted to pick up and transport a container and to dump the same, comprising a stationary substantially U-shaped frame assembly having a pair of transversely spaced apart longitudinally extending side members and a transverse member connecting said side members at one end thereof defining a compartment open at one end for receiving said container, wheels respectively connected to said side members on either side of said compartment for supporting said vehicle, a tiltable frame assembly having a pair of longitudinally extending side members on either side of said compartment and respectively pivoted to said stationary frame side members adjacent the open end of said compartment at points remote from said transverse frame member, a pair of container-engaging members respectively pivotally mounted on each of said tiltable frame assembly side members adapted in a lowered position to engage said container when on the ground and in the raised position to carry said container in said compartment, means respectively connecting each of said pairs of engaging members for engaging and carrying said container, means spanning said compartment and connecting corresponding engaging members on either side thereof whereby said engaging members raise and lower in unison, means respectively mounted on said tiltable frame assembly side members and operatively connected to said container-engaging members for raising and lowering the same whereby said container is picked up from the ground and carried in said compartment, means respectively mounted on said stationary frame assembly side members and operatively connected to said tiltable frame assembly side members for tilting said tiltable frame assembly whereby said container is dumped, and means for retaining said container in said tiltable frame assembly during the tilting operation.

7. A vehicle adapted to pick up and transport a container and to dump the same, comprising a stationary substantially U-shaped frame assembly having a pair of transversely spaced apart longitudinally extending side members and a transverse member connecting said side members at one end thereof defining a compartment open at one end for receiving said container, wheels respectively connected to said members on either side of said compartment for supporting said vehicle, a tiltable frame assembly having a pair of longitudinally extending side members on either side of said compartment respectively pivoted to said stationary frame side members adjacent the open end of said compartment at points remote from said transverse frame member, each of said tilting frame assembly side members having a pair of longitudinally spaced apart lever members, each of said lever members having one end pivotally connected to said tilting frame assembly side member, the other ends of said lever members having means for engaging a lip of said container, said levers being movable from a lowered position for engaging said container lip into a raised position for carrying said container in said compartment, hydraulic cylinder means respectively mounted on said tilting frame assembly side members and operatively connected to said lever members for raising and lowering the same whereby said container is picked up from the ground and carried in said compartment, and hydraulic cylinder means respectively mounted on said stationary frame side members and operatively connected to said tiltable frame assembly side members for tilting said tiltable frame assembly whereby said container is dumped.

8. A vehicle adapted to pick up and transport a container, and to dump the same, comprising a stationary substantially U-shaped frame assembly having a pair of transversely spaced apart longitudinally extending side members and a transverse member connecting said side members at one end thereof defining a compartment open at one end for receiving said container, wheels respectively connected to said side members on either side of said compartment for supporting said vehicle, a tiltable frame assembly having a pair of longitudinally extending side members on either side of said compartments respectively pivoted to said stationary frame side members adjacent the open end of said compartment at points remote from said transverse frame member, each of said tilting frame assembly side members having a pair of longitudinally spaced apart lever members each having one end pivotally connected to said tiltable frame assembly side member, a member joining the other ends of each of said pairs of said lever members for engaging a lip of said container, said levers being movable from a lowered position for engaging said container lip into a raised position for carrying said container in said compartment, hydraulic cylinder means respectively mounted on said tilting frame side members and operatively connected to said lever members for raising and lowering the same whereby said container is picked up from the ground and carried in said compartment, and hydraulic cylinder means respectively mounted on said stationary frame side members and operatively connected to said tilting frame assembly side members for tilting said tilting frame assembly whereby said container is dumped.

9. A vehicle adapted to pick up and transport a container and to dump the same, comprising a stationary substantially U-shaped frame assembly having a pair of transversely spaced apart longitudinally extending side members and a transverse member connecting said side members at one end thereof defining a compartment open at one end for receiving said container, wheels respectively connected to said side members on either side of said compartment for supporting said vehicle, a tiltable frame assembly having a pair of longitudinally extending side members on either side of said compartment respectively pivoted to said stationary frame side members adjacent the open end of said compartment at points remote from said transverse frame member, each of said tilting frame assembly side members having a pair of longitudinally spaced apart lever members each having one end pivotally connected to said side member, a member joining the other ends of each of said pairs of lever members for engaging a lip of said container, said levers being movable from a lowered position for engaging said container into a raised position for carrying said container in said compartment, hydraulic cylinder means respectively pivotally mounted on said tilting frame assembly side members to the rear of said lever members and operatively connected thereto for raising and lowering the same whereby said container is picked up from the ground and carried in said compartment, and hydraulic cylinder means respectively pivotally mounted on said stationary frame assembly side members and operatively connected to said tilting frame assembly side members for tilting said tilting frame assembly where said container is dumped.

10. A vehicle adapted to pick up and transport a container and to dump the same, comprising a stationary substantially U-shaped frame assembly having a pair of transversely spaced apart longitudinally extending side members and a transverse member connecting said side members at one end thereof defining a compartment open at one end for receiving said container, wheels respectively connected to said side members on either side of said compartment for supporting said vehicle, a tiltable frame assembly having a pair of longitudinally extending side members on either side of said compartment respectively pivoted to said stationary frame side members adjacent the open end of said compartment at points remote from said transverse frame member, each of said tilting frame assembly side members having a pair of longitudinally spaced apart lever members each having one end pivotally connected to said side member, a member joining the other ends of each of said pairs of lever members for engaging the lip of said container, said levers being movable from a lowered position for engaging said container lip into a raised position for carrying said container in said compartment, each of said lever members having a projecting portion adjacent its outer end, hydraulic cylinder means respectively pivotally mounted on said tilting frame assembly side members on the side of said lever members remote from same projections and operatively connected thereto for raising and lowering said levers whereby said container is picked up from the ground and carried in said compartment, each of said tilting frame assembly side members having a fixed lever secured thereto, and hydraulic cylinder means respectively pivotally mounted on said stationary frame side members and operatively connected to said fixed levers for tilting said tilting frame assembly whereby said container is dumped.

11. A vehicle adapted to pick up and transport a container and to dump same, comprising a stationary substantially U-shaped frame assembly having a pair of transversely spaced apart longitudinally extending side members defining a compartment open at one end for receiving said container, a tiltable frame assembly having a pair of longitudinally extending side members on either side of said compartment respectively pivoted to said stationary frame side members adjacent the open end of said compartment, each of said tilting frame assembly side members having a pair of longitudinally spaced apart lever members each having one end pivotally connected to said tilting frame assembly side member, a member joining the other ends of each of said pairs of lever members for engaging said container, said levers being movable from a lowered position for engaging said container into its raised position for carrying said container in said compartment, hydraulic cylinder means respectively mounted on said tilting frame assembly side members and operatively connected to said lever members for raising and lowering the same whereby said container is picked up from the ground and carried in said compartment, and hydraulic cylinder means respectively mounted on said stationary frame side members and operatively connected to said tilting frame assembly side members for tilting said tiltable frame assembly whereby said container is dumped.

12. A vehicle adapted to pick up and transport a container and to dump the same, comprising a stationary substantially U-shaped frame assembly having a pair of transversely spaced apart longitudinally extending side members defining a compartment open at one end for receiving said container, a tiltable frame assembly having a pair of longitudinally extending side members on either side of said compartment respectively pivoted to said stationary frame side members adjacent the open end of said compartment, each of said tilting frame assembly side members having a lever member having one end pivotally connected thereto, the other end of each of said lever members having means for engaging said container, said levers being movable from a lowered position for engaging said container into a raised position for carrying said container in said compartment, hydraulic cylinder means respectively mounted on said tilting frame assembly side members and operatively connected to said lever members for raising and lowering the same whereby said container is picked up from the ground and carried in said compartment, hydraulic cylinder means respectively mounted on said stationary frame assembly side members and operatively connected to said tiltable frame assembly side members for tilting said tiltable frame assembly whereby said container is dumped, and means on said lever members operable when said lever members are in the raised position to prevent said container from falling when said tiltable frame assembly is raised.

13. A vehicle adapted to pick up and transport a container and to dump the same comprising a stationary frame assembly having a pair of transversely spaced-apart longitudinally extending side members defining a compartment open at one end for receiving said container, a tiltable frame assembly having a pair of longitudinally extending side members on either side of said compartment respectively pivoted to said stationary frame side members adjacent the open end of said compartment, each of said tilting frame assembly side members having a lever member having one end pivotally connected thereto, the other ends of said levers having means for engaging said container, said levers being movable from a lowered position for engaging said container into a raised position for carrying said container in said compartment, hydraulic cylinder means respectively mounted on said tilting frame assembly side members and operatively connected to said lever members for raising and lowering the same whereby said container is picked up from the ground and carried in said compartment, hydraulic cylinder means respectively mounted on said stationary frame side members and operatively connected to said tiltable frame assembly side member for tilting said tiltable frame assembly whereby said container is dumped, and means for retaining said container in said tiltable frame assembly during the tilting operation.

14. In a vehicle for picking up, transporting and tilting a container, a stationary frame assembly having transversely spaced apart wheels connected thereto for supporting the vehicle and having a compartment between said wheels open at one end for receiving the container, a tiltable frame assembly pivotally mounted on said stationary frame assembly and straddling said compartment, means adapted in a first position to engage said container and in a second position to carry said container in said compartment, said last-mentioned means being pivotally mounted on said tiltable frame member, means for actuating said container-engaging means for moving the same from said first position to said second position thereof to pick up the container from the ground and lift the container into said compartment, and means for tilting said tiltable frame assembly.

MILLARD H. JEWETT.

References Cited in the file of this patent

UNITED STATES PATENTS

| Number | Name | Date |
|---|---|---|
| 1,294,798 | Harvey | Feb. 18, 1919 |
| 1,451,127 | Thornton | Apr. 10, 1923 |
| 1,506,136 | Remde | Aug. 26, 1924 |
| 1,985,169 | Howell et al. | Dec. 18, 1934 |
| 2,027,421 | Eisenberg | Jan. 14, 1936 |
| 2,123,505 | Faries | July 12, 1938 |
| 2,219,525 | Maxon | Oct. 29, 1940 |
| 2,264,216 | Milligan | Nov. 25, 1941 |
| 2,299,971 | Foshee | Oct. 27, 1942 |
| 2,332,962 | Barrett | Oct. 26, 1943 |
| 2,351,846 | Swim et al. | June 20, 1944 |
| 2,445,038 | Riemenschneider et al. | July 13, 1948 |
| 2,449,863 | Ross | Sept. 21, 1948 |
| 2,462,907 | Savage | Mar. 1, 1949 |
| 2,487,508 | Anderson | Nov. 8, 1949 |
| 2,527,369 | Meyer | Oct. 24, 1950 |
| 2,603,369 | Soderstrom | July 15, 1952 |

FOREIGN PATENTS

| Number | Country | Date |
|---|---|---|
| 623,795 | Germany | Jan. 4, 1936 |